May 19, 1964  R. G. BECKER  3,133,759
TARGET RING ASSEMBLY FOR AIRCRAFT EXTERNAL CARGO HOOK
Filed April 26, 1962
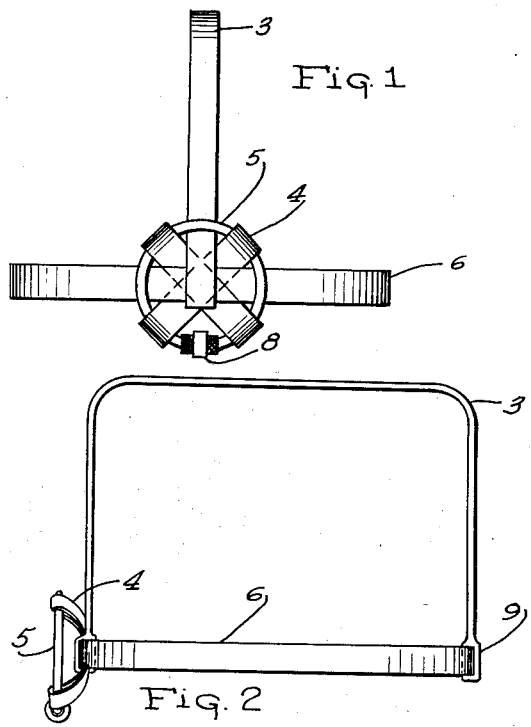
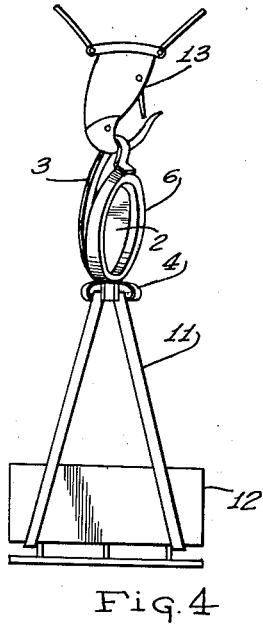
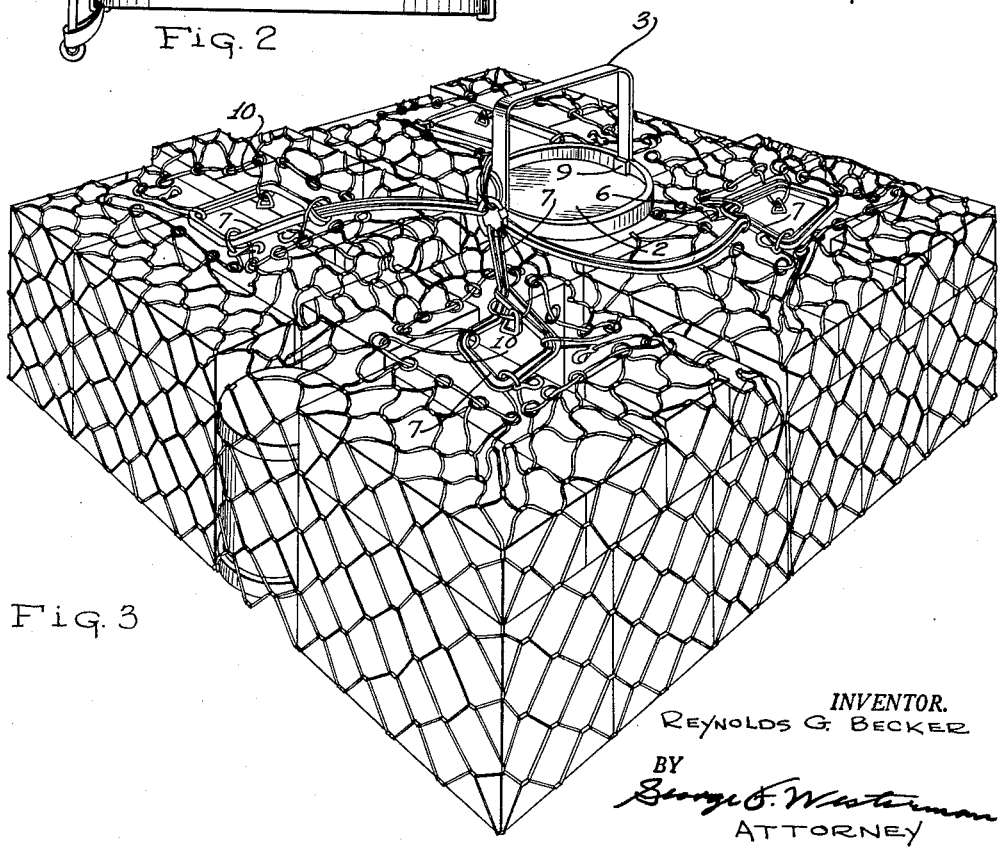
INVENTOR.
REYNOLDS G. BECKER
BY
ATTORNEY

United States Patent Office 3,133,759
Patented May 19, 1964

3,133,759
TARGET RING ASSEMBLY FOR AIRCRAFT EXTERNAL CARGO HOOK
Reynolds G. Becker, Yorktown, Va., assignor to the United States of America as represented by the Secretary of the Army
Filed Apr. 26, 1962, Ser. No. 190,510
7 Claims. (Cl. 294—74)
(Granted under Title 35, U.S. Code (1952), sec. 266)

The invention described herein may be manufactured and used by or for the Government for governmental purposes without the payment to me of any royalty thereon.

This invention relates to improvements in cargo attachment devices for external aircraft cargoes and more particularly external helicopter cargoes.

An object of this invention is to provide a loop type target ring together with appurtenant cargo attaching accessories which can be conveniently engaged or disengaged by an external aircraft or helicopter cargo hook while the aircraft is in flight.

This target ring and target sling assembly is particularly adapted for use with external loads carried by helicopters. The pickup and release of cargo by helicopter, without the use of ground assist personnel, is a most desirable feature for helicopter transport operations. Ground personnel are subjected not only to danger of exposure to the strong air currents created by the helicopter, but also to the danger of high static electricity potential which charges the helicopter while in the air and which is grounded by ground assist personnel when working with airborne cargo apparatus. Further, during military operations, ground personnel are subjected to the additional hazard of exposure to small arms fire in tactical situations. Accordingly, a second and further object of this invention is to provide a simple target ring and adapter assembly through which an external aircraft cargo hook can engage an air transportable cargo package without utilization of ground assist personnel during the operation. A further object of this invention is to provide a target ring and adapter assembly which can be quickly and easily attached to an air transportable cargo package or to a cargo net surrounding such a package and which can be readily engaged by an external helicopter cargo hook without the assistance of ground personnel.

A still further object resides in the provisions of an improved target ring assembly of substantially unitary construction having a minimum number of parts and no parts requiring adjustment.

It is also an object of this invention to provide a target ring assembly which will, under all conditions, and without complicated structural support, maintain the target ring or bail in an upright position convenient for engagement by the external cargo hook of an aircraft.

Briefly, the device comprises a semicircular or U-shaped target bail, a circular support bail to which the ends of the target bail are affixed at diametrically opposite locations around the support bail and an eye secured to the target and support bails at one end of the target bail for connecting sling components to the assembly.

Other features and advantages will appear in the description wherein:

FIG. 1 is a side elevational view of the target ring assembly constituting the subject matter of the invention.

FIG. 2 is a side view of the target ring assembly rotated 90 degrees from the position shown in FIG. 1.

FIG. 3 is a perspective view of a net inclosed cargo package and the target ring assembly of the invention in operative position and in actual engagement with the cargo net, through intermediate slings; and FIG. 4 shows the target ring assembly engaged with an external aircraft cargo hook and supporting an air transportable cargo package.

Referring now in detail to the preferred embodiment of this invention, the target and supporting structure is shown in FIGS. 1 and 2. The target loop or bail 3 in this embodiment is an inverted U-shaped structure constructed of five thicknesses of No. 8700 breaking strength soft nylon webbing which has been thoroughly stitched and slightly impregnated with a preservative. A convenient length for the target loop in helicopter operations, is approximately fifty-four inches overall. Each end of the bail 3 is returned and stitched to provide at each end thereof a heavy loop 9 which passes around the support ring 6, the loops 9 being opposite one another on the circumference of the support ring. At one junction of support ring 6 and bail 3 is the cargo fastening means consisting of straps 4 and eye 5. Straps 4 are each of nylon webbing approximately eleven inches in length, of double thickness, and having open loops at each end approximately three inches in length. The straps are crossed within the circumference of support ring 6 and stitched to bail 3 as well as support ring 6. Support ring 6, in this embodiment, has been made of three thicknesses of naturally stiff nylon webbing stitched together.

Attached to the inner circumference of support ring 6 and stretched over the entire area of the circle outlined by this ring is a diaphragm 2, which is of a highly resilient material. The purpose of diaphragm 2, which is not essential but is considered highly desirable in this embodiment, is to eliminate any chance of the external cargo hook snagging any protrusion of equipment, or the cargo net, or of any intermediate sling between the cargo itself and the target ring. The diaphragm also prevents the hook from engaging the support ring 6 rather than the target bail 3. Eye 5 is made of rolled nylon webbing, is thoroughly stitched, and is, in this embodiment, approximately 21 inches in length. The two ends of the eye 5 are connected by a quick detachable coupling 8 which is a 90° turn fastener.

FIG. 3 depicts the target ring assembly shown in FIGS. 1 and 2, applied to a net inclosed cargo package for picking up, transporting, and releasing the package. The eye 5 is connected to four intermediate slings 7 which are of double thickness nylon webbing. These sling straps are secured, each at one end, to eye 5 and have portions at their opposite ends laced through the net draw cable 10, disposed in the form of a cat's paw knot. These intermediate sling straps or webs, as shown in FIG. 3, may be applied in different lengths in order to allow net loads to hang at varying distances from the target ring.

FIG. 4 shows a palletized cargo package 12 supported by a target ring assembly, including the components 3, 4, 5, and 6, from a helicopter external cargo hook 13.

Other variations may, of course, be resorted to without departing from the scope of the invention.

I claim:

1. A target ring assembly adapted to be secured to an air transportable cargo package and engaged by a helicopter external cargo hook while the associated helicopter is in flight, for lifting and carrying the cargo package, said target ring assembly comprising a circular ring of stiff fabric adapted to rest in flatwise position on the top surface of a cargo package, a bail secured at its opposite ends to said ring at diametrically opposite locations around the ring and upstanding therefrom, and an eye secured to said ring at one end of said bail for connection to cargo sling components, whereby said ring and said bail act to lift the associated cargo package when said bail is engaged by a helicopter external cargo hook.

2. A target ring assembly for connecting an air transportable cargo package to a helicopter external cargo hook of the open throat type comprising a base ring formed of suitable stiff fabric and adapted to rest in flatwise position on the top of a cargo package, a hook engageable bail also formed of a suitable stiff fabric, connected at its ends to said support ring at locations spaced apart around the circumference of the ring, said bail having a height and width sufficient to enable a helicopter pilot to engage the bail with an open throat cargo hook suspended from a helicopter while the helicopter is in flight and without the assistance of ground personnel, and said support ring having a diameter sufficient to effectively support said bail in upright position, a closed eye disposed outside of said supporting ring at one end of said bail, straps secured at opposite ends to said eye and laced around said support ring to secure said eye to said support ring and said bail, and sling straps secured to said eye and adapted to be connected to a cargo package for connecting said target ring assembly to a cargo package for lifting said package when said bail is engaged by a helicopter external cargo hook.

3. A target ring assembly for connecting an air transportable cargo package to a helicopter external cargo hook comprising a base ring adapted to rest in flatwise position and on top of a cargo package, a diaphragm of flexible sheet material stretched over the inclosed area of said ring to maintain the ring above upwardly projecting items of cargo in the cargo package, a bail secured at its opposite ends to said ring at locations spaced apart around the ring and upstanding substantially perpendicularly from the ring, an eye member disposed adjacent said ring at one end of said bail, webs secured to said eye and extending across the side of said ring remote from said eye to secure said eye to said ring, and sling straps detachably secured to said eye and adapted to be secured to the cargo package for connecting the target ring assembly to the cargo package.

4. A target ring assembly as defined in claim 3 wherein said support ring, said bail, and said eye are formed of heavy synthetic fiber webbing.

5. A target ring assembly as defined in claim 3 wherein said support ring, said bail, and said eye are formed of heavy synthetic fiber webbing, said ring and said bail being stitched and said eye being rolled and having its ends connected together by a quick-detachable fastener.

6. A target ring assembly for connecting an air transportable cargo package to a helicopter extenral cargo hook comprising a flexible base ring adapted to rest in a flatwise position on top of a cargo package, a flexible bail secured at its ends to said ring and upstanding perpendicularly therefrom, said ring being adapted to support said bail in upright position on top of an air transportable cargo package for engagement by a cargo hook suspended from a helicopter, a flexible eye disposed adjacent the other side of said ring at one end of said bail, flexible means securing said eye to said ring and said bail, and flexible sling components engaged with said eye for connecting an air transportable cargo package to said eye.

7. A unitary assembly for enabling a helicopter provided with a suspended cargo hook to pick up, carry and release an air transportable cargo package comprising a flexible support ring, a flexible U-shaped bail secured at its ends to and upstanding from said support ring, and a sling attaching eye secured to said ring at one end of said bail, said ring being positionable on the top of a cargo package to support said bail above the cargo package in position to be engaged by a helicopter cargo hook.

References Cited in the file of this patent

UNITED STATES PATENTS

| 819,576 | McCabe | May 1, 1906 |
| 3,005,653 | Becker | Oct. 24, 1961 |
| 3,046,045 | Campbell | July 24, 1962 |